United States Patent
Zhang et al.

(10) Patent No.: US 11,257,293 B2
(45) Date of Patent: Feb. 22, 2022

(54) AUGMENTED REALITY METHOD AND DEVICE FUSING IMAGE-BASED TARGET STATE DATA AND SOUND-BASED TARGET STATE DATA

(71) Applicants: BEIJING JINGDONG SHANGKE INFORMATION TECHNOLOGY CO., LTD., Beijing (CN); BEIJING JINGDONG CENTURY TRADING CO., LTD., Beijing (CN)

(72) Inventors: Weihua Zhang, Beijing (CN); Jiangxu Wu, Beijing (CN); Fan Li, Beijing (CN); Ganglin Peng, Beijing (CN); Hongguang Zhang, Beijing (CN); Leifeng Kong, Beijing (CN)

(73) Assignees: BEIJING JINGDONG SHANGKE INFORMATION TECHNOLOGY CO., LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 0 days.

(21) Appl. No.: 16/771,120

(22) PCT Filed: Nov. 6, 2018

(86) PCT No.: PCT/CN2018/114156
§ 371 (c)(1),
(2) Date: Jun. 9, 2020

(87) PCT Pub. No.: WO2019/114464
PCT Pub. Date: Jun. 20, 2019

(65) Prior Publication Data
US 2021/0174592 A1   Jun. 10, 2021

(30) Foreign Application Priority Data

Dec. 11, 2017 (CN) .......................... 201711308889.X

(51) Int. Cl.
*G06T 19/00* (2011.01)
*G06T 7/70* (2017.01)
(Continued)

(52) U.S. Cl.
CPC ........ *G06T 19/006* (2013.01); *G06K 9/00255* (2013.01); *G06K 9/6223* (2013.01); *G06T 7/70* (2017.01)

(58) Field of Classification Search
CPC ........... G06K 9/00302; G06K 9/00335; H04N 21/233; H04N 21/23418; H04N 21/235; H04N 21/8153
See application file for complete search history.

(56) References Cited

U.S. PATENT DOCUMENTS 9,230,367 B2    1/2016 Stroila
2012/0276504 A1*  11/2012 Chen ..................... G09B 5/067
                                          434/157

(Continued)

FOREIGN PATENT DOCUMENTS

CN      105323252 A    2/2016
CN      105700682 A    6/2016

(Continued)

OTHER PUBLICATIONS

English translation of International Search Report for Application No. PCT/CN2018/114156 dated Jan. 30, 2019 (2 pages).

(Continued)

*Primary Examiner* — Jin Cheng Wang
(74) *Attorney, Agent, or Firm* — Michael Best & Friedrich LLP

(57) ABSTRACT

The invention discloses an augmented reality method and device, and relates to the field of computer technology. A specific implementation of the method includes: acquiring video information of a target, and acquiring real image (Continued)

information and real sound information of the target from the same; using the real image information to determine at least one image-based target state data, and using the real sound information to determine at least one sound-based target state data; fusing the image-based and sound-based target state data of the same type to obtain a target portrait data; and acquiring virtual information corresponding to the target portrait data, and superimposing the virtual information on the video information. This implementation can identify the current state of the target based on the image information and sound information of the target, and fuse the two identification results to obtain an accurate target portrait. Based on the target portrait, virtual information display matching the user status can be displayed, thereby improving augmented reality and user experience.

11 Claims, 4 Drawing Sheets

(51) Int. Cl.
    *G06K 9/00*    (2006.01)
    *G06K 9/62*    (2006.01)

(56) References Cited

U.S. PATENT DOCUMENTS

| | | | | |
|---|---|---|---|---|
| 2014/0112556 | A1* | 4/2014 | Kalinli-Akbacak | G06K 9/00302 382/128 |
| 2015/0099946 | A1* | 4/2015 | Sahin | G16H 50/20 600/301 |
| 2015/0332088 | A1* | 11/2015 | Chembula | G06K 9/468 382/203 |
| 2016/0191958 | A1* | 6/2016 | Nauseef | H04N 21/8153 725/116 |
| 2017/0024087 | A1* | 1/2017 | Pathy | H04L 67/306 |
| 2017/0061200 | A1* | 3/2017 | Wexler | G06K 9/00718 |
| 2017/0178287 | A1* | 6/2017 | Anderson | G06K 9/00228 |
| 2017/0270970 | A1* | 9/2017 | Ho | G06F 16/5854 |
| 2017/0310927 | A1* | 10/2017 | West | G06K 9/00302 |
| 2018/0144775 | A1* | 5/2018 | Taine | H04N 7/155 |
| 2018/0160055 | A1* | 6/2018 | Taine | G06K 9/00711 |
| 2018/0160959 | A1* | 6/2018 | Wilde | A61B 5/164 |
| 2018/0300557 | A1* | 10/2018 | Rodenas | G11B 27/10 |
| 2019/0336724 | A1* | 11/2019 | Li | A61B 5/742 |

FOREIGN PATENT DOCUMENTS

| | | |
|---|---|---|
| CN | 105933738 A | 9/2016 |
| CN | 105955490 A | 9/2016 |
| CN | 106127828 A | 11/2016 |
| CN | 106200918 A | 12/2016 |
| CN | 106503646 A | 3/2017 |
| CN | 107124662 A | 9/2017 |
| EP | 1318658 A2 | 6/2003 |

OTHER PUBLICATIONS

Chines Patent Office Action for Application No. 201711308889.X dated Jun. 3, 2020 (8 pages).
Chinese Patent Office Action for Application No. 201711308889.X dated Jan. 20, 2021 (8 pages including statement of relevance).
Chinese Patent Office Action for Application No. 201711308889.X dated May 7, 2021 (6 pages including statement of relevance).
European Patent Office Extended Search Report for U.S. Appl. No. 18/888,999 dated May 21, 2021 (11 pages).
Mello et al., "A Review and Meta-Analysis of Multimodal Affect Detection Systems", ACM Computing Surveys, vol. 47, No. 3, 2015, pp. 1-36.
Agrawal et al., "Fusion based Emotion Recognition System", 2016 International Conference on Computational Science and Computational Intelligence, IEEE, 2016, pp. 727-732.
Busso et al., "Analysis of Emotion Recognition using Facial Expressions, Speech and Multimodal Information", ICMI, 2004, pp. 205-211.
Chinese Patent Office action for Application No. 201711308889 dated Aug. 26, 2021 (2 pages including statement of relevance).

* cited by examiner

AUGMENTED REALITY METHOD AND DEVICE FUSING IMAGE-BASED TARGET STATE DATA AND SOUND-BASED TARGET STATE DATA

CROSS-REFERENCE TO RELATED APPLICATION(S)

This is a U.S. national stage entry of International Patent Application No. PCT/CN2018/114156, filed on Nov. 6, 2018, which claims priority to Chinese Patent Application No. 201711308889.X, filed on Dec. 11, 2017, the entire contents of each of which are fully incorporated herein by reference.

TECHNICAL FIELD OF THE INVENTION

The present invention relates to the field of computer techniques, especially to an augmented reality method and device.

BACKGROUND ART OF THE INVENTION

Augmented reality, which is a technique of real-time computing the position and angle of a photo for increasing the corresponding image, video and three-dimensional model, can apply the virtual information rarely experienced in reality to the real world, thereby producing an effect beyond reality.

In actual application, the augmented reality technique is widely applied in the environments including webcast and the like for superimposing various virtual information on a user image, so as to diversify the image content and make the interaction more interesting. FIG. 1 illustrates several application examples of the augmented reality technique in webcast. In FIG. 1, the virtual images superimposed on the user image are rabbit ears, spectacles, garland, hairpin and stars successively.

During the process of implementing the present invention, the inventors found out that, in the prior art, it is difficult for the user's portrait to accurately reflect the user's current state, and thus the virtual information for the superimposed display usually does not match the user's current state, leading to a relatively low degree of user experience.

CONTENTS OF THE INVENTION

In view of the foregoing, the embodiments of the present invention provide an augmented reality method and device, which can identify a current state of the target according to image information and sound information thereof, fuse the identification results of the two aspects to obtain an accurate target portrait, display virtual information matching the user state on the basis of the target portrait, thereby improving the augmented reality performance and the user experience.

In order to achieve the aforesaid objective, according to one aspect of the present invention, an augmented reality method is provided.

The augmented reality method of the embodiments of the present invention includes acquiring video information of a target, and acquiring real image information and real sound information of the target from the same; using the real image information to determine at least one image-based target state data, and using the real sound information to determine at least one sound-based target state data; fusing the image-based and sound-based target state data of the same type to obtain target portrait data; acquiring virtual information corresponding to the target portrait data, and superimposing the virtual information on the video information.

Optionally, the target state data includes at least one of a emotion data, age data and gender data; and any one of the target state data includes judgment result of the target state and the confidence degree corresponding to said judgment result.

Optionally, the real image information includes facial image information of the target; and using the real image information to determine at least one image-based target state data includes determining position information of a plurality of critical points from the facial image information, and performing tilt correction on the facial image information using the position information; extracting a plurality of facial feature values from the corrected facial image information, inputting them into a pre-established image classification model to obtain at least one image-based target state data.

Optionally, using the real sound information to determine at least one sound-based target state data includes extracting a plurality of audio feature parameters from the real sound information, and performing clustering of the audio feature parameters; inputting the clustered audio feature parameters into a pre-established sound classification model to obtain at least one sound-based target state data.

Optionally, fusing the image-based and sound-based target state data of the same type to obtain the target portrait data includes, for any two groups of the image-based and sound-based target state data of the same type, i.e., a first state data and a second state data, wherein, the first state data is an image-based target state data including a first judgment result and a first confidence degree, and the second state data is a sound-based target state data including a second judgment result and the second confidence degree; comparing whether the first judgment result is identical with the second judgment result: when the comparison result indicates they are identical, detecting whether the sum of the first confidence degree and the second confidence degree is greater than a first confidence threshold: if yes, determining the first judgment result or the second judgment result as the target portrait data; when the comparison result indicates they are different, detecting whether the greater one of the first confidence degree and the second confidence degree is greater than a second confidence threshold: if yes, determining the judgment result corresponding to the greater one as the target portrait data.

Optionally, the second confidence threshold is greater than the first confidence threshold.

Optionally, the virtual information includes at least one of a visual information, acoustic information and specific effect information.

In order to achieve the aforesaid objective, according to another aspect of the present invention, an augmented reality device is provided.

The augmented reality device of the embodiments of the present invention includes a target identification unit for acquiring video information of a target, and acquiring real image information and real sound information of the target from the same; using the real image information to determine at least one image-based target state data, and using the real sound information to determine at least one sound-based target state data; and a fusing display unit for fusing the image-based and sound-based target state data of the same type to obtain a target portrait data; acquiring virtual information corresponding to the target portrait data, and superimposing the virtual information on the video information.

Optionally, the target state data includes at least one of a emotion data, age data and gender data; and any one of the target state data includes judgment result of the target state and the confidence degree corresponding to said judgment result.

Optionally, the real image information includes facial image information of the target; and the target identification unit may further serve to determine position information of a plurality of critical points from the facial image information, and perform tilt correction on the facial image information using the position information; extract a plurality of facial feature values from the corrected facial image information, input them into a pre-established image classification model, and obtain at least one image-based target state data.

Optionally, the target identification unit may further serve to extract a plurality of audio feature parameters in the real sound information, and perform clustering of the audio feature parameters; input the clustered audio feature parameters into a pre-established sound classification model, and obtain at least one sound-based target state data.

Optionally, the fusing display unit may further serve to, for any two groups of the image-based and sound-based target state data of the same type, i.e., a first state data and a second state data, wherein the first state data is an image-based target state data including a first judgment result and a first confidence degree, and the second state data is a sound-based target state data including a second judgment result and a second confidence degree; compare whether the first judgment result is identical with the second judgment result: when the comparison result indicates they are identical, detect whether the sum of the first confidence degree and the second confidence degree is greater than a first confidence threshold: if yes, determine the first judgment result or the second judgment result as the target portrait data; when the comparison result indicates they are different, detect whether the greater one of the first confidence degree and the second confidence degree is greater than the second confidence threshold: if yes, determine the judgment result corresponding to the greater one as the target portrait data.

Optionally, the second confidence threshold is greater than the first confidence threshold.

Optionally, the virtual information includes at least one of a visual information, acoustic information and specific effect information.

In order to achieve the aforesaid objective, according to another aspect of the present invention, an electronic apparatus is provided.

An electronic apparatus of the present invention includes one or more processors; and a storage device for storing one or more programs when executed by the one or more processors to enable the one or more processors to implement the augmented reality method provided in the present invention.

In order to achieve the aforesaid objective, according to one further aspect of the present invention, a computer-readable storage medium is provided.

The present invention relates to a computer-readable storage medium having a computer program stored thereon and executed by processors to implement the augmented reality method provided in the present invention.

According to the technical solution of the present invention, one embodiment in the aforesaid invention has the following advantages or advantageous effects: by acquiring real image information and real sound information from video information of the target, and acquiring target state data by means of image and sound respectively, thereby fusing target state data acquired in the two means to obtain a target portrait data that can accurately reflect the current state of the target, and then superimposing the virtual information matching the target portrait data on the video information, a better augment reality effect of the target can be achieved.

The further effect of the aforesaid non-conventional alternatives will be described below with reference to the embodiments.

DESCRIPTION OF THE FIGURES

The figures serve to better understand the present invention, and do not constitute any improper limitation to the present invention, in which.

EMBODIMENTS OF THE INVENTION

The exemplary examples of the present invention are described below with reference to the figures, including various details of the embodiments of the present invention for facilitating understanding, and they shall be only considered exemplary. Thus, an ordinary person skilled in the art shall realize that various changes and amendments may be made to the examples described herein without deviating from the scope and spirit of the present invention. Likewise, for the sake of clarity and simplicity, the commonly known function and structure are omitted in the following description.

The technical solutions of the embodiments of the present invention realize image-based identification of emotion, age and gender by performing critical point detection, tilt correction and feature extraction of user image information, and inputting the extracted features into a pre-established image classification model; realize sound-based identification of emotion, age and gender by performing feature extraction and feature clustering of the user sound information, and inputting the clustered features into a pre-established sound classification model; and then, the identification results of the two aspects of image and sound are fused according to confidence degrees to obtain an accurate discrimination result of the user in three dimensions of emotion, age and gender, by means of which a virtual information highly matching the user's current state can be acquired for augmented reality displaying, thereby improving the augmented reality performance and the user experience.

It should be noted that the embodiments of the present invention and the technical features therein may be combined with each other without conflict.

Figure 1:
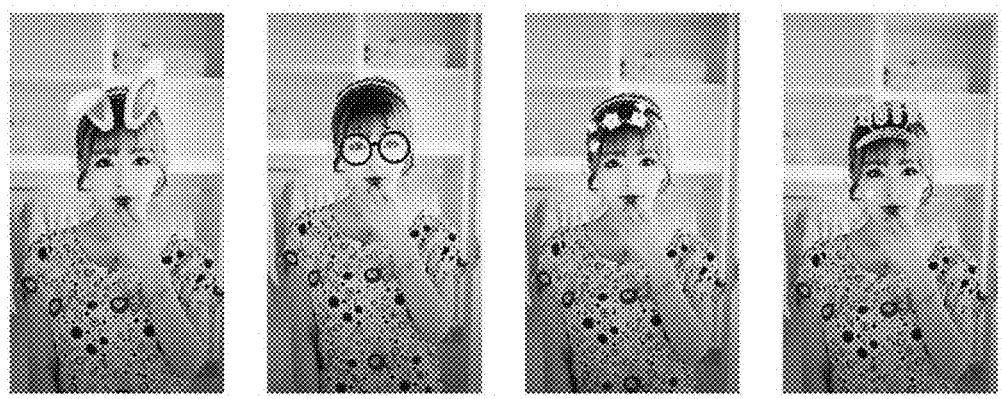
FIG. 1 is a schematic diagram of specific application of the augmented reality techniques in the prior art.
Figure 2:
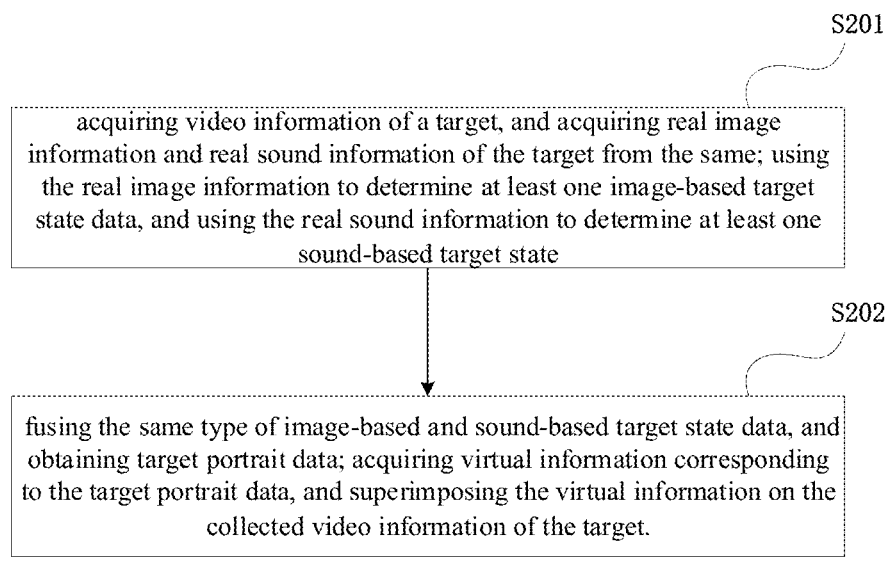
FIG. 2 is a schematic diagram of main steps of the augmented reality method according to the embodiments of the present invention.

FIG. 2 is a schematic diagram of main steps of the augmented reality method according to the embodiments of the present invention;

As shown in FIG. 2, the augmented reality method of the embodiments of the present invention specifically performs the following steps:

Step S201: acquiring video information of a target, and acquiring real image information and real sound information of the target from the same; using the real image information to determine at least one image-based target state data, and using the real sound information to determine at least one sound-based target state data.

In this step, the target refers to a reality body to which the augmented reality method is applied, which may be any tangible individual that can make a sound. Exemplarily, the target in this step refers to a person in certain display space, for example, broadcasters appearing in various terminal display interfaces in a webcast scene. The real image information and real sound information are both acquired from the video information of the target, in which the real image information refers to the image information formed by collecting the shapes of the target in the real world, and the real sound information refers to the sound information obtained by collecting the sounds of the target in the real world.

It needs to be noted that, in the embodiments of the present invention, the aforesaid real image information and real sound information are relative concepts of the virtual information to be introduced in the following context. Unlike the real image information and real sound information, the virtual information refers to the artificially fictitious information including image, sound, video, three-dimensional model and the like that is isolated from the real-world environment in which the target is situated.

In this step, target state data refers to, based on certain dimension, data characterizing the current state of the target in said dimension. Any group of target state data includes the judgment result of the target state in certain dimension, and the confidence degree corresponding to said judgment result. In general, the confidence degree is a positive number of no greater than 1.

In one alternative implementation, in order to implement an accurate target portrait, the aforesaid dimension may be several target features in higher correlation with the augmented reality performance, such as emotion, age, and gender, and the aforesaid dimension each corresponds to one target state data. For example, the dimensions of emotion, age and gender correspond to emotion data, age data and gender data, respectively, in which any group of the emotion data includes the judgment result of the target state in the emotion dimension and the corresponding confidence degree, any group of the age data includes the judgment result of the target state in the age dimension and the corresponding confidence degree, and any group of the gender data includes the judgment result of the target state in the gender dimension and the corresponding confidence degree.

In any dimension, there are generally multiple preset judgment results of the target state. For example, in the emotion dimension, the judgment results of the target state may be neutrality, anger, scorn, disgust, fear, delight, sadness, and astonishment. In the age dimension, the judgment result of the target state may be 0-4, 4-8, 8-16, 16-25, 25-34, 34-48, 48-60, and more than 60. In the gender dimension, the judgment result of the target state may be male and female.

In the current application environment, since it is difficult to achieve accurate identification of the user state, the virtual information for the superimposed display is usually inappropriate, which causes the prior art to have an unsatisfactory augmented reality performance. In view of the aforesaid problem, in the embodiments of the present invention, the image-based and sound-based target state data in various dimensions are first acquired by means of the image information and sound information of the target respectively, then data of the two aspects are fused, and the final discrimination of the target state is achieved on the basis of fusion for generating an accurate target portrait. For the image information, In actual applications, in order to acquire the state judgment result of the user in the dimensions of emotion, age and gender, the facial image information of the target is generally required for identification.

To be specific, the following steps may be performed to acquire an image-based target state data:

1. Determining position information of a plurality of critical points from the facial image information of the target, in which the critical points may be the identification points of the facial features of the target, such as the center of the left eye, the center of the right eye, the center of the nose, the left corner of the mouth, and the right corner of the mouth. In actual application environments, the critical point detection in this step may be implemented using MTCNN (Multi-Task Convolutional Neural Networks). MTCNN is a multi-task human face detection frame, which employs three CNN (Convolutional Neutral Network) cascade algorithm structures, and can perform human face frame detection and human face feature point detection simultaneously. The specific method of implementing MTCNN will no longer be described here since it belongs to the known techniques.

Figure 3:
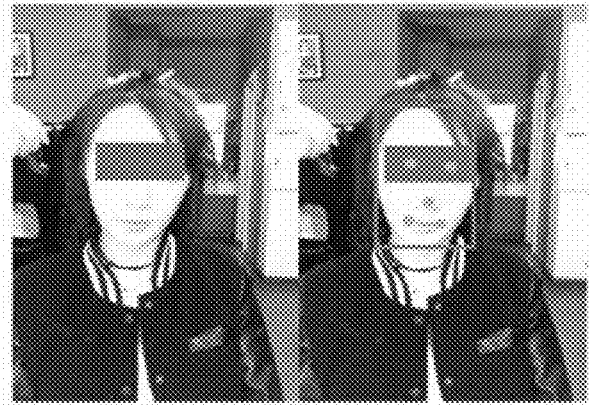
FIG. 3 is a schematic diagram of critical point detection of the augmented reality method according to the embodiments of the present invention.

FIG. 3 is a schematic diagram of critical point detection of the augmented reality method according to the embodiments of the present invention, in which the left side view is a facial image before the critical point detection, and the five points included in the rectangle of the right side view are critical points detected using MTCNN.

2. Performing tilt correction on the facial image information using the position information of the critical points. To be specific, tilt correction may be implemented using the position information of the center of the left eye and the center of the right eye, or the left corner of the mouth and the right corner of the mouth. Taking the center of the left eye and the center of the right eye for example, if the horizontal rectangular coordinates thereof are $(x_1, y_1)$, $(x_2, y_2)$ successively, the correction angle may be $\arctg[(y_2-y_1)/(x_2-x_1)]$.

3. Extracting a plurality of facial feature values in the corrected facial image information. In the actual application, a plurality of facial feature values may be extracted using the FaceNet network, and the triplet loss function may be selected as the corresponding loss function. FaceNet is a known method for human face verification, identification, and clustering, which follows the principle of mapping images to the Euclidean space through Convolutional Neutral Network, and determining the similarity thereof by the distance of the images in the Euclidean space, thereby obtaining the result of computation. The specific method for implementing FaceNet is not described in detail here.

4. Inputting the extracted facial feature values into a pre-established image classification model for obtaining the judgment result of the target state in various dimensions and the corresponding confidence degree, in which the image classification model may employ a SVM (Support Vector Machine)-based supervised learning classifier, the training data set in the emotion dimension may employ the Extended Cohn-Kanade Dataset, and the training dataset in the age and gender dimension may employ the Adience Dataset. SVM is a known algorithm for classification by constructing a hyperplane, and the specific performing steps thereof are not introduced in detail here. The Extended Cohn-Kanade Dataset and Adience Dataset are both existing datasets.

Through the aforesaid steps, target state data in the three dimensions of emotion, age and gender characterizing the current state thereof can be acquired using the real image information of the target, so as to, in the image aspect, solve the problem that the prior art cannot realize the identification in the aforesaid dimensions and thus has difficulty in providing the highly matched virtual information.

While the image-based information identification is performed, the following steps may be performed to acquire a sound-based target state data:

1. Extracting a plurality of audio feature parameters in the real sound information. Exemplarily, the audio feature parameters may be MFCC (Mel-Frequency Cepstral Coefficients) commonly used in the field of voice identification.

2. Performing clustering of the extracted audio feature parameters. To be specific, clustering of the audio feature parameters in this step may be implemented using an existing K-means clustering algorithm.

3. Inputting the clustered audio feature parameters into a pre-established sound classification model for obtaining the judgment result of the target state in various dimensions and the corresponding confidence degree, in which the sound classification model may be a GBDT (Gradient Boosting Decision Tree)-based supervised learning classifier network, which is obtained by training the training sets in the dimensions of emotion, age and gender. GBDT is a known iterative decision tree algorithm, which is composed of multiple decision trees and leads to a final discrimination result by accumulating the conclusions of all the decision trees, and the specific performing steps will not be described here.

According to the aforesaid steps, target state data in the three dimensions of emotion, age and gender characterizing the current state thereof can be acquired using the real sound information of the target, so as to, in the sound aspect, solve the problem that the prior art cannot realize the identification in the aforesaid dimensions and thus has difficulty in providing the highly matched virtual information.

Step S202: fusing the image-based and sound-based target state data of the same type to obtain a target portrait data; acquiring virtual information corresponding to the target portrait data, and superimposing the virtual information on the collected video information of the target.

In this step, image-based and sound-based target state data of the same type refers to the data corresponding to the same dimension in the image-based and sound-based target state data. For example, a group of image-based emotion data and a group of sound-based emotion data belong to target state data of the same type, and a group of image-based emotion data and a group of sound-based age data or gender data do not belong to target state data of the same type. The target portrait data refers to the final discrimination data of the target state obtained by fusing the data of the two aspects of image and sound. In general, target portrait only includes the judgment result of the target state, and does not include a confidence degree.

As one preferred technical solution, the following steps may be performed for fusing the same type of target state data, so as to acquire an accurate user portrait:

1. For any two groups of target state data of the same type, e.g., a first state data and a second state data, if the first state data is an image-based target state data including a first judgment result and a first confidence degree, and the second state data is a sound-based target state data including a second judgment result and a second confidence degree, the first judgment result and the second judgment result are firstly compared to determine whether they are identical.

2. When the comparison result indicates they are identical, whether the sum of the first confidence degree and the second confidence degree is greater than a first confidence threshold is detected; if yes, the first judgment result or the second judgment result is determined as the target portrait data.

3. When the comparison result indicates they are different, whether the greater one in the first confidence degree and the second confidence degree is greater than a second confidence threshold is detected; if yes, the judgment result corresponding to the greater one is determined as the target portrait data. In specific applications, the second confidence threshold is set to be greater than the first confidence threshold, so as to exclude part of the data in low confidence degree when the judgment results are different and ensure accuracy of the user portrait.

For example, by detecting the real image information of the target, the following three groups of image-based target state data in the dimensions of emotion, age and gender are respectively obtained:

(anger, 0.3) (16-25, 0.5) (male, 0.8)

By detecting the real sound information of the target, the following three groups of image-based target state data in the dimensions of emotion, age and gender are respectively obtained:

(anger, 0.35) (16-25, 0.5) (female, 0.7)

For the aforesaid target state data, target state data of the same type therein is first determined:

(anger, 0.3) and (anger, 0.35) are target state data of the same type;

(16-25, 05) and (16-25, 0.05) are target state data of the same type;

(male, 0.8) and (female, 0.7) are target state data of the same type; and the first confidence threshold and the second confidence threshold are determined as 0.6, and 0.65, respectively.

Then, for (anger, 0.3) and (anger, 0.35), the judgment results of the target states thereof are identical, and the sum of the confidence degrees of 0.65 is greater than the first confidence threshold. Thus, "anger" is determined as the target portrait data;

For (16-25, 0.5) and (16-25, 0.05), the judgment results of the target states thereof are identical, and the sum of the confidence degrees of 0.55 is less than the first confidence threshold. Thus, "16-25" does not belong to the target portrait data;

For (male, 0.8) and (female, 0.7), the judgment results of the target states thereof are different, and the greater one of the two confidence degrees of 0.8 is greater than the second confidence threshold 0.65. Thus, the judgment result "male" of the target state corresponding to the confidence degree 0.8 is determined as the target portrait data;

Finally, by fusing data of the two aspects, the target portrait data is acquired as (anger, male).

Through the aforesaid process, the present invention fuses the identification results of the two aspects of image and sound according to the confidence degree to obtain an accurate discrimination result of the user in the three dimensions of emotion, age and gender, by means of which a virtual information highly matching the user's current state can be acquired for augmented reality displaying in the following steps, so as to improve the augmented reality performance and the user experience.

After the target portrait data is obtained, the virtual information corresponding to the target portrait data may be selected for display. In actual application scenes, virtual information may be one or more of visual information, acoustic information and specific effect information, in which the visual information refers to visible information such as image, video, and the like, the acoustic information refers to audible information such as music, human voice, and the like, and the specific effect information refers to visible information and/or audible information that is produced by a computing device and rarely appears in the real world. In actual applications, the virtual information may also be fused information of visual information and acoustic information. Preferably, the virtual information is pre-stored in a storage device such as database and the like, and the virtual information each corresponds to a specific target portrait data. For example, target portrait data (anger, male) corresponds to virtual information "flame effect around the body, smoky effect of the nostril", and "hard metal music", and target portrait data (delight, 4-8, female) corresponds to virtual information "image of a little girl", "certain children's song", and "rabbit ear effect".

Preferably, when the virtual information is displayed, the virtual information may be superimposed onto the collected video information of the target. In actual applications, the aforesaid virtual information may be synthesized with the real image information, and/or real sound information in the video information of the target and displayed after synthesis. It is understandable that the aforesaid synthesis refers to combination of the virtual information and the real information of the target. For example, the splicing and overlapping among images, and the splicing and overlapping among sounds can both be regarded as synthesis. In addition, in specific application scenes, the virtual information may be synthesized separately with the real image information of the target, or separately with the real sound information of the target, or may be used under the following circumstances: synthesizing one part of the virtual information with the real image information of the target, and synthesizing the other part with the real sound information of the target.

After step S202, the embodiments of the present invention may fuse target state data in the two aspects of image and sound, automatically acquire an accurate target portrait data, and then realize a highly matched personalized virtual information display according to the target portrait data to achieve a better augmented reality effect.

It needs to be noted that, although the live network broadcast environment is illustrated as an example for many times in the previous context, yet the augmented reality method of the embodiments of the present invention does not be confined to this environment. In fact, the augmented reality method of the embodiments of the present invention may be used in the augmentation of reality in any environment having video information, such as video software producing environments, electronic photo album editing environments, movie viewing environments and the like. The application scene of the augmented reality method is unlimited in the present invention.

In the technical solutions of the present invention, a image-based identification of the emotion, age and gender is realized by performing critical point detection, tilt correction and feature extraction of user image information, and inputting the extracted features into a pre-established image classification model; a sound-based identification of the emotion, age and gender is realized by performing feature extraction and feature clustering of the user sound information, and inputting the clustered features into a pre-established sound classification model; and then, the identification results of the two aspects of image and sound are fused according to confidence degrees to obtain an accurate discrimination result of the user in three dimensions of emotion, age and gender, by means of which a virtual information highly matching the user's current state can be acquired for augmented reality displaying, thereby improving the augmented reality performance and the user experience.

Figure 4:
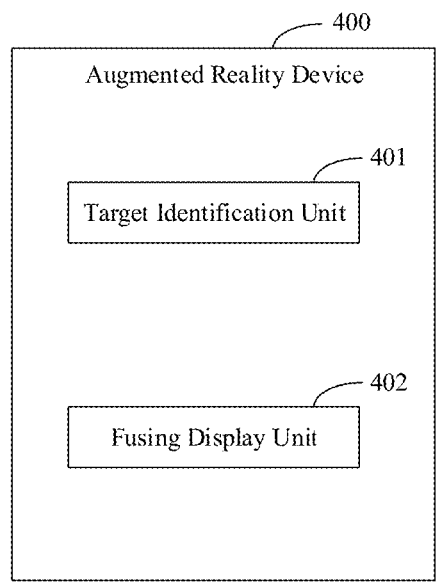
FIG. 4 is a schematic diagram of a main part of the augmented reality device according to the embodiments of the present invention.

FIG. 4 is a schematic diagram of a main part of the augmented reality device according to the embodiments of the present invention.

As shown in FIG. 4, the augmented reality device 400 according to the embodiments of the present invention may include a target identification unit 401 and a fusing display unit 402, in which:

the target identification unit 401 may serve to acquire video information of a target, and acquire real image information and real sound information of the target from the same; use the real image information to determine at least one image-based target state data, and use the real sound information to determine at least one sound-based target state data;

the fusing display unit 402 may serve to fuse the image-based and sound-based target state data of the same type, and obtain target portrait data; acquire virtual information corresponding to the target portrait data, and superimpose the virtual information on the video information.

In the embodiments of the present invention, the target state data includes at least one of emotion data, age data and gender data; any group in any one of target state data includes judgment result of the target state, and the confidence degree corresponding to said judgment result; and the real image information includes facial image information of the target.

Preferably, the target identification unit 401 may further serve to determine position information of a plurality of critical points from the facial image information, and perform tilt correction on the facial image information using the position information; extract a plurality of facial feature values from the corrected facial image information, input them into a pre-established image classification model, and obtain at least one image-based target state data.

As a preferred technical solution, the target identification unit 401 may further serve to extract a plurality of audio feature parameters in the real sound information, and perform clustering of the audio feature parameters; input the clustered audio feature parameters into a pre-established sound classification model, and obtain at least one sound-based target state data.

In actual applications, the fusing display unit 402 may further serve to, for any two groups of image-based and sound-based target state data of the same type, i.e., a first state data and a second state data, wherein the first state data is an image-based target state data including a first judgment result and a first confidence degree, and the second state data is a sound-based target state data including a second judgment result and a second confidence degree; compare whether the first judgment result is identical with the second judgment result: when the comparison result indicates they are identical, detect whether the sum of the first confidence degree and the second confidence degree is greater than a first confidence threshold: if yes, determine the first judgment result or the second judgment result as the target portrait data; when the comparison result indicates they are different, detect whether the greater one of the first confidence degree and the second confidence degree is greater than the second confidence threshold: if yes, determine the judgment result corresponding to the greater one as the target portrait data, wherein the second confidence threshold is greater than the first confidence threshold.

In one alternative implementation, the virtual information includes at least one of a visual information, acoustic information and specific effect information.

According to the technical solutions of the present invention, a image-based identification of the emotion, age and gender is realized by performing critical point detection, tilt correction and feature extraction of user image information, and inputting the extracted features into a pre-established image classification model; a sound-based identification of the emotion, age and gender is realized by performing feature extraction and feature clustering of the user sound information, and inputting the clustered features into a pre-established sound classification model; and then, the identification results of the two aspects of image and sound are fused according to confidence degrees to obtain an accurate discrimination result of the user in three dimensions of emotion, age and gender, by means of which a virtual information highly matching the user's current state can be acquired for augmented reality displaying, thereby improving the augmented reality performance and the user experience.

Figure 5:
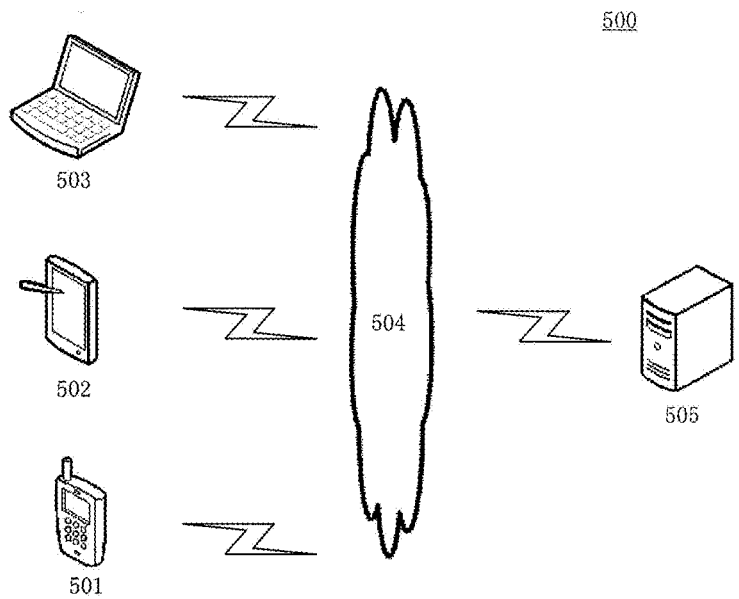
FIG. 5 is a diagram of an exemplary systematic architecture that, according to the embodiments of the present invention, can be applied thereto.

FIG. 5 illustrates an exemplary systematic architecture 500 that may employ the augmented reality method or the augmented reality device of the embodiments of the present invention.

As shown in FIG. 5, the systematic architecture 500 may include terminal devices 501, 501, 503, a network 504 and a server 505 (this architecture is only an illustration, and the components included in the specific architecture may be adjusted according to specific circumstances the present application). The network 504 serves to provide a medium of communication links between the terminal devices 501, 502, and 503 and the server 505. The network 504 may include various connection types, such as wired, wireless communication links or fiber-optic cables and the like.

The user may use the terminal devices 501, 502, and 503 to interact with the server 505 through the network 504, so as to receive or transmit messages and the like. Various applications may be installed on the terminal devices 501, 502, and 503, such as webcast applications, web browser applications, vide software producing applications, electronic photo album editing applications and video playing applications and the like (only for illustration).

The terminal devices 501, 502, and 503 may be various electronic apparatuses that are provided with display screens and support web browsing, including, but is not limited to, smart phone, tablet personal computer, laptop computer and desktop computer and the like.

The server 505 may be a server providing various services, for example, a streaming media server (only for illustration) for providing support to the webcast applications operated by the user using the terminal devices 501, 502, and 503. The streaming media server may process the received video viewing request, and feedback the processing result (for example, the broadcaster video, only for illustration) to the terminal devices 501, 502, and 503.

In actual applications, the augmented reality method provided in embodiments of the present invention may be performed by the terminal devices 501, 502, and 503, and accordingly the augmented reality device may be provided in the terminal devices 501, 502, and 503. In other application scenes, the augmented reality method provided in the embodiments of the present invention may be performed by the server 505, and accordingly the augmented reality device can be provided in the server 505.

It is understandable that the number of the terminal devices, network and server in FIG. 5 is only exemplary. There may be any number of terminal devices, network and server according to the needs of implementation.

The application of the augmented reality method provided in the embodiments of the present invention in the webcast scene is introduced below based on the architecture shown in FIG. 5. During the webcast process, the terminal device 501 at which the broadcaster is situated collects video information including the real image information and real sound information, and allocates the video information to the terminal devices 502 and 503 at which the viewers are situated through the server 505. When the broadcaster performs the relevant operations and wishes to realize augmented reality functions, the concrete steps are as follows:

1. The terminal device 501 at which the broadcaster is situated collects the current video information of the broadcaster, and acquire the real image information and the real sound information from the same.

2. The terminal device 501 determines the image-based emotion data, age data and gender data from the real image information, determines the sound-based emotion data, age data and gender data from the real sound information, and fuses target state data in the two aspects of the same type to obtain the target portrait data of the broadcaster in the dimensions of emotion, age and gender.

3. The terminal device 501 acquires the virtual information corresponding to the target portrait data from a local database, and superimposes it onto the video information of the broadcaster, thereby realizing augmented reality at the terminal device 501.

4. The terminal device 501 encodes the video information superimposed with the virtual information, and transmits it to the server 505 based on RTMP (Real Time Messaging Protocol) and the network 504. The server 505 allocates the encoded video information to the terminal devices 502 and 503 at which the viewers are situated according to the RTMP protocol and the network 504, and the broadcaster video superimposed with the virtual information can be viewed after the terminal devices 502 and 503 at which the viewers are situated decode the information, such that augmented reality is displayed at respective terminal devices of the webcast.

The present invention further provides an electronic apparatus. The electronic apparatus of the embodiments of the present invention includes one or more processors, and a storage device for storing one or more programs when executed by the one or more processors to enable the one or more processors to implement the augmented reality method provided in the present invention.

Figure 6:
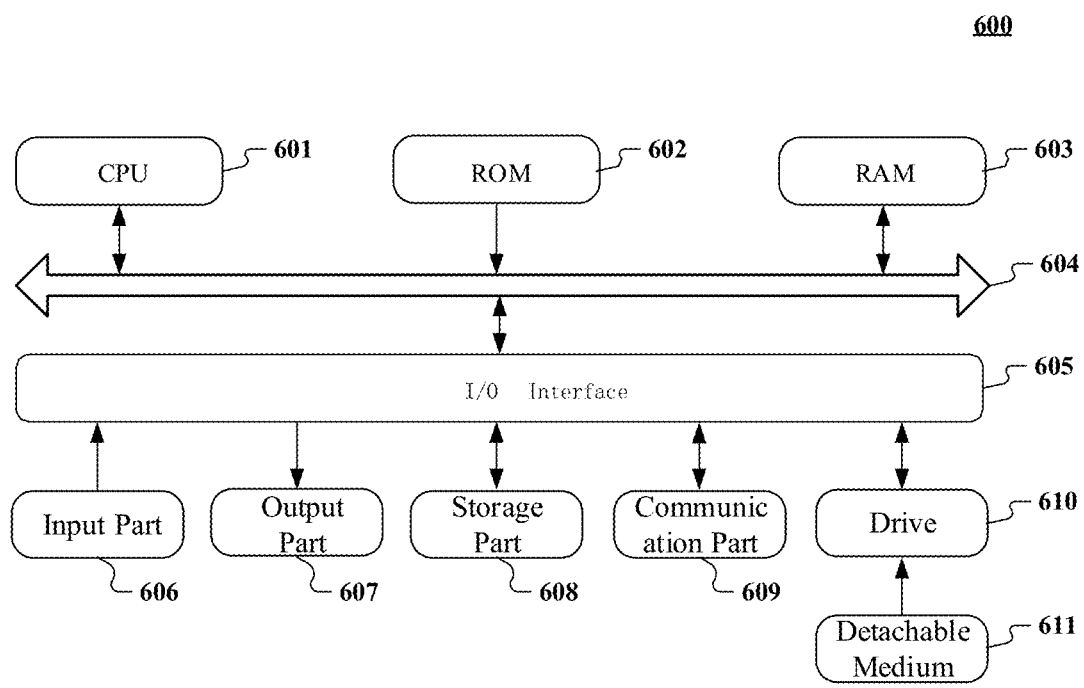
FIG. 6 is a structural diagram of an electronic apparatus for implementing the augmented reality method of the embodiments of the present invention.

Referring to FIG. 6 below, it illustrates a schematic diagram of the computer system 600 of the electronic apparatus suitable for implementing the embodiments of the present invention. The electronic apparatus shown in FIG. 6 is only an illustration, and the function and application scope of the embodiments of the present invention shall not be limited.

As shown in FIG. 6, the computer system 600 includes a central processing unit (CPU) 601, which may perform various appropriate actions and processing according to the program stored in a read-only memory (ROM) 602 or the program loaded to a random access memory (RAM) 603 from a storage part 608. In the RAM 603, various programs and data required for the operations of the computer system 600 are also stored. CPU 601, ROM 602 and RAM 603 are connected with one another through a bus 604, and an input/output (I/O) interface 605 is also connected to the bus 604.

The following components are connected to the I/O interface 605: an input part 606 including keyboard, mouse, and the like; an output part 607 including such as cathode-ray tube (CRT), liquid crystal display (LCD), and loudspeaker and the like; a storage part 608 including hardware and the like; and a communication part 609 including a network interface card such as LAN card, modem and the like. The communication part 609 performs the communication processing via a network, e.g., the Internet. A drive 610 is also connected to the I/O interface 605 as required. A detachable medium 611 such as disk, optical disk, magneto-optical disk, semiconductor memory and the like needs to be installed on the drive 610 as required, such that the computer program read thereon can be installed into the storage part 608 as required.

Especially, according to the examples disclosed in the present invention, the process described in the diagram of the main steps in the previous context may be implemented as a computer software program. For example, the embodiments of the present invention include a computer program product, which includes a computer program provided on the computer readable medium, and the computer program includes program codes for performing method shown in the diagram of the main steps. In the aforesaid examples, said computer program may be downloaded and installed from the network through the communication part 609, and/or installed from the detachable medium 611. When said computer program is performed by the central processing unit 601, the aforesaid function defined in the system of the present invention is performed.

As another aspect, the present invention further provides a computer readable medium, which may be included in the device described in the aforesaid examples, or may be separately present without being assembled into said device. The aforesaid computer readable medium is provided with one or more programs when executed by said device to enable said device to perform the steps of: acquiring video information of a target, and acquiring real image information and real sound information of the target from the same; using the real image information to determine at least one image-based target state data, and using the real sound information to determine at least one sound-based target state data; fusing the image-based and sound-based target state data of the same type to obtain target portrait data; acquiring virtual information corresponding to the target portrait data, and superimposing the virtual information on the video information.

According to the technical solutions of the present invention, a image-based identification of the emotion, age and gender is realized by performing critical point detection, tilt correction and feature extraction of user image information, and inputting the extracted features into a pre-established image classification model; a sound-based identification of the emotion, age and gender is realized by performing feature extraction and feature clustering of the user sound information, and inputting the clustered features into a pre-established sound classification model; and then, the identification results of the two aspects of image and sound are fused according to confidence degrees to obtain an accurate discrimination result of the user in three dimensions of emotion, age and gender, by means of which a virtual information highly matching the user's current state can be acquired for augmented reality displaying, thereby improving the augmented reality performance and the user experience.

It needs to be noted that the computer readable medium shown in the present invention may be a computer readable signal medium or a computer readable storage medium or any combination thereof. The computer readable storage medium, for example, may be, but is not limited to, system, apparatus or device of electricity, magnetism, light, electromagnetism, infrared ray, or semiconductor, or any combinations thereof. More specific examples of the computer readable storage medium may include, but is not limited to, electrical connection having one or more wires, portable computer disk, hard disk, random access memory (RAM), read only memory (ROM), erasable programmable read only memory (EPROM or flash memory), optical fiber, portable compact disk read only memory (CD-ROM), optical storage device, magnetic storage device, or any suitable combinations thereof. In the present invention, the computer readable storage medium may be any tangible medium including or storing programs, which may be used by or used in combination with an instruction executing system, apparatus or device. In the present invention, the computer readable single medium may be included in a base band or serve as a data signal transmitted by part of the carrier wave, in which computer-readable program codes are provided. Such transmitted data signal may employ multiple forms, and include, but is not limited to, electromagnetic signal, optical signal or any suitable combinations thereof. The computer readable signal medium may also be any computer readable medium other than the computer readable storage medium, which may send, broadcast or transmit the programs used by or used in combination with an instruction executing system, apparatus or device. The program codes included on the computer readable medium may be transmitted using any appropriate medium, which includes, but is not limited to, wireless, electric wire, optical cable, RF and the like, or any suitable combinations thereof.

The flow diagrams and block diagrams in the drawings illustrate the systematic architecture, function and operation that are probably implemented by the system, method and computer program product according to various examples of the present invention. In this aspect, each block in the flow diagrams or block diagrams may represent a module, program segment or part of the codes, and the aforesaid module, program segment, or part of the codes include one or more executable instructions for implementing the specified logical function. It should also be noted that, in some implementations as alternatives, the functions marked in the blocks may also occur in an order different from that is marked in the drawings. For example, two successively represented block diagrams may actually be executed substantially in parallel with each other. They may also be executed in an opposite order sometimes, which depends on the functions concerned therein. It is also to be noted that each block in the block diagrams or flow diagrams, and combinations of the blocks in the block diagrams or flow diagrams may be implemented using a hardware-based system exclusive for performing specified function or operation, or may be implemented using a combination of special hardware and computer instructions.

The concerned units described in the embodiments of the present invention may be implemented by software, or by hardware. The described units may also be set in the processor, for example, may be described as a processor including a target identification unit and a fusing display unit, in which the names of these units do not constitute a limitation to said units per se under certain circumstances, for example, the target identification unit may also be described as "a unit for providing target state data to the fusing display unit".

The aforesaid embodiments do not constitute a limitation to the protection scope of the present invention. It should be understandable to a person skilled in the art that various amendments, combinations, subcombinations and substitutions may occur depending on the design requirements and other factors. Any amendment, equivalent substitution and improvement within the spirit and principle of the present invention shall fall within the protection scope of the present invention.

The invention claimed is:

1. An augmented reality method comprising:
   acquiring video information of a target;
   acquiring real image information of the target and real sound information of the target from the video information;
   using the real image information to determine at least one image-based target state data corresponding to each of a plurality of dimensions;
   using the real sound information to determine at least one sound-based target state data corresponding to each of the plurality of dimensions;
   fusing, for each dimension of the plurality of dimensions, the image-based target state data corresponding to the dimension and the sound-based target state data corresponding to the same dimension to obtain target portrait data;
   acquiring virtual information corresponding to the target portrait data; and
   superimposing the virtual information on the video information,
   wherein the image-based target state data includes at least one of emotion data, age data, and gender data, wherein the sound-based target state data includes at least one of emotion data, age data, and gender data, and wherein at least one of the image-based target state data and the sound-based target state data includes a judgment result and a confidence degree corresponding to the judgment result,
   wherein the image-based target state data includes first state data including a first judgment result and a first confidence degree and the sound-based target state data includes second state data including a second judgment results and a second confidence degree and wherein fusing the image-based target state data corresponding to the dimension and the sound-based target state data corresponding to the same dimension to obtain the target portrait data includes:
   comparing whether the first judgment result is identical with the second judgment result;
   when the comparison result indicates the first judgment result is identical to the second judgment result are identical:
      detecting whether the sum of the first confidence degree and the second confidence degree is greater than a first confidence threshold; and
      when the sum of the first confidence degree and the second confidence degree is greater than the first confidence threshold, determining the first judgment result or the second judgment result as the target portrait data; and
   when the comparison result indicates the first judgment result is different from the second judgment result:
      detecting whether a greater one of the first confidence degree and the second confidence degree is greater than a second confidence threshold; and
      when the greater one of the first confidence degree and the second confidence degree is greater than the second confidence threshold, determining the judgment result corresponding to the greater one of the first confidence degree and the second confidence degree as the target portrait data,
   wherein the second confidence threshold is greater than the first confidence threshold.

2. The method according to claim 1, wherein the real image information includes facial image information of the target; and wherein using the real image information to determine the at least one image-based target state data includes:
   determining position information of a plurality of critical points from the facial image information;
   performing tilt correction on the facial image information using the position information;
   extracting a plurality of facial feature values in the corrected facial image information; inputting the plurality of facial feature values into a pre-established image classification model to obtain the at least one image-based target state data.

3. The method according to claim 1, wherein using the real sound information to determine the at least one sound-based target state data includes:
   extracting a plurality of audio feature parameters in the real sound information;
   performing clustering of the audio feature parameters; and
   inputting the clustered audio feature parameters into a pre-established sound classification model to obtain the at least one sound-based target state data.

4. The method according to claim 1, wherein the virtual information includes at least one of visual information, acoustic information, and effect information.

5. An electronic apparatus, comprising:
   one or more processors; and
   a storage device for storing one or more programs;
   wherein the one or more processors are configured, via execution of the one or more programs, to:
      acquire video information of a target;
      acquire real image information of the target from the video information;
      acquire real sound information of the target from the video information;
      use the real image information to determine at least one image-based target state data corresponding to each of a plurality of dimensions;
      use the real sound information to determine at least one sound-based target state data corresponding to each of the plurality of dimensions;
      fuse, for each dimension of the plurality of dimensions, the image-based target state data corresponding to the dimension and sound-based target state data corresponding to the same dimension to obtain target portrait data;
      acquire virtual information corresponding to the target portrait data; and
      superimpose the virtual information on the video information,
      wherein the image-based target state data includes at least one of emotion data, age data, and gender data, wherein the sound-based target state data includes at least one of emotion data, age data, and gender data, and wherein at least one of the image-based target state data and the sound-based target state data includes a judgment result and a confidence degree corresponding to the judgment result,
wherein the image-based target state data includes first state data including a first judgment result and a first confidence degree and the sound-based target state data includes second state data including a second judgment results and a second confidence degree and wherein the one or more processors are configured to fuse the image-based target state data corresponding to the dimension and the sound-based target state data corresponding to the same dimension to obtain the target portrait data by:
comparing whether the first judgment result is identical with the second judgment result:
when the comparison result indicates the first judgment result is identical to the second judgment result are identical,
detecting whether the sum of the first confidence degree and the second confidence degree is greater than a first confidence threshold; and
when the sum of the first confidence degree and the second confidence degree is greater than the first confidence threshold, determining the first judgment result or the second judgment result as the target portrait data; and
when the comparison result indicates the first judgment result is different from the second judgment result,
detecting whether a greater one of the first confidence degree and the second confidence degree is greater than a second confidence threshold; and
when the greater one of the first confidence degree and the second confidence degree is greater than the second confidence threshold, determining the judgment result corresponding to the greater one of the first confidence degree and the second confidence degree as the target portrait data,
wherein the second confidence threshold is greater than the first confidence threshold.

6. The electronic apparatus according to claim 5, wherein the real image information includes facial image information of the target and wherein the one or more processors are configured to use the real image information to determine the at least one image-based target state data by:
determining position information of a plurality of critical points from the facial image information;
performing tilt correction on the facial image information using the position information;
extracting a plurality of facial feature values in the corrected facial image information; and inputting the plurality of facial feature values into a pre-established image classification model to obtain the at least one image-based target state data.

7. The electronic apparatus according to claim 5, wherein the one or more processors are configured to use the real sound information to determine the at least one sound-based target state data by:
extracting a plurality of audio feature parameters in the real sound information;
performing clustering of the audio feature parameters; and
inputting the clustered audio feature parameters into a pre-established sound classification model to obtain the at least one sound-based target state data.

8. The electronic apparatus according to claim 5, wherein the virtual information includes at least one of visual information, acoustic information, and effect information.

9. A non-transitory computer readable storage medium having a computer program stored thereon executable by a processor to perform a set of functions, the set of functions comprising:
acquiring video information of a target;
acquiring real image information of the target from the video information;
acquiring real sound information of the target from the video information;
using the real image information to determine at least one image-based target state data corresponding to each of a plurality of dimensions;
using the real sound information to determine at least one sound-based target state data corresponding to each of a plurality of dimensions;
fusing, for each dimension of the plurality of dimensions, the image-based target state data corresponding to the dimension and the sound-based target state data corresponding to the same dimension to obtain target portrait data;
acquiring virtual information corresponding to the target portrait data; and
superimposing the virtual information on the video information,
wherein the image-based target state data includes at least one of emotion data, age data, and gender data, wherein the sound-based target state data includes at least one of emotion data, age data, and gender data, and wherein at least one of the image-based target state data and the sound-based target state data includes a judgment result and a confidence degree corresponding to the judgment result
wherein the image-based target state data includes first state data including a first judgment result and a first confidence degree and the sound-based target state data includes second state data including a second judgment results and a second confidence degree and wherein fusing the image-based target state data corresponding to the dimension and the sound-based target state data corresponding to the same dimension to obtain the target portrait data includes:
comparing whether the first judgment result is identical with the second judgment result:
when the comparison result indicates the first judgment result is identical to the second judgment result are identical,
detecting whether the sum of the first confidence degree and the second confidence degree is greater than a first confidence threshold; and
when the sum of the first confidence degree and the second confidence degree is greater than the first confidence threshold, determining the first judgment result or the second judgment result as the target portrait data; and
when the comparison result indicates the first judgment result is different from the second judgment result,
detecting whether a greater one of the first confidence degree and the second confidence degree is greater than a second confidence threshold; and
when the greater one of the first confidence degree and the second confidence degree is greater than the second confidence threshold, determining the judgment result corresponding to the greater one of the first confidence degree and the second confidence degree as the target portrait data,
wherein the second confidence threshold is greater than the first confidence threshold.

10. The non-transitory computer readable storage medium according to claim 9, wherein the real image information includes facial image information of the target and wherein using the real image information to determine the at least one image-based target state data includes:
   determining position information of a plurality of critical points from the facial image information;
   performing tilt correction on the facial image information using the position information;
   extracting a plurality of facial feature values in the corrected facial image information;
   inputting the plurality of facial feature values into a pre-established image classification model to obtain the at least one image-based target state data.

11. The non-transitory computer readable storage medium according to claim 9, wherein using the real sound information to determine at least one sound-based target state data includes:
   extracting a plurality of audio feature parameters in the real sound information;
   performing clustering of the audio feature parameters; and
   inputting the clustered audio feature parameters into a pre-established sound classification model to obtain the at least one sound-based target state data.

* * * * *